United States Patent [19]

Balasubramanian et al.

[11] Patent Number: 5,739,927
[45] Date of Patent: Apr. 14, 1998

[54] METHOD FOR REFINING AN EXISTING PRINTER CALIBRATION USING A SMALL NUMBER OF MEASUREMENTS

[75] Inventors: Thyagarajan Balasubramanian, Webster; Martin Sidney Maltz, Rochester, both of N.Y.

[73] Assignee: Xerox Corporation, Stamford, Conn.

[21] Appl. No.: 480,972

[22] Filed: Jun. 7, 1995

[51] Int. Cl.$^6$ ............................................. H04N 1/46
[52] U.S. Cl. ............................... 358/518; 358/523
[58] Field of Search .................... 358/515–523; 382/167; 395/109

[56] References Cited

U.S. PATENT DOCUMENTS

| | | | |
|---|---|---|---|
| 4,500,919 | 2/1985 | Schreiber | 358/78 |
| 5,416,613 | 5/1995 | Rolleston et al. | 358/518 |
| 5,471,324 | 11/1995 | Rolleston | 358/518 |
| 5,483,360 | 1/1996 | Rolleston et al. | 358/518 |
| 5,491,568 | 2/1996 | Wan | 358/518 |
| 5,508,826 | 4/1996 | Lloyd et al. | 358/501 |
| 5,528,386 | 6/1996 | Rolleston et al. | 358/522 |
| 5,539,522 | 7/1996 | Yoshida | 358/518 |

*Primary Examiner*—Edward L. Coles
*Assistant Examiner*—Stephen Brinich
*Attorney, Agent, or Firm*—Fay, Sharpe, Beall, Fagan, Minnich & McKee

[57] ABSTRACT

A color imaging system has a color correction table (10) connected to a printer (12). A set of refinement colors $x_i$ are selected to determine the accuracy of the system. The number of refinement colors selected is small in relation to the number of locations in the color correction table (10), e.g., 1–50%. For each refinement color x, the printer (12) prints a color patch of corresponding color. A measuring device (14) measures each color patch and determines a corresponding colorimetric value x'. A refinement table (16) is generated which maps x' to x using an error difference between x' and x. An interpolator (22) interpolates the known error values across the refinement table based on a weighted sum of the known error values. The weighting is inversely proportional to a Euclidean distance of each interpolated error value from the known error values.

14 Claims, 5 Drawing Sheets

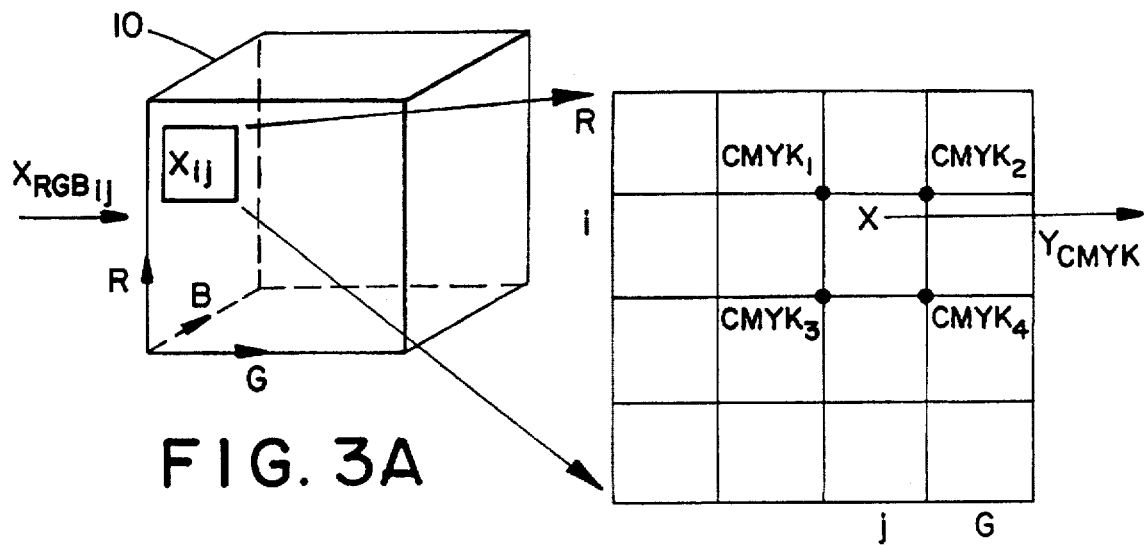
FIG. 3A
FIG. 3B
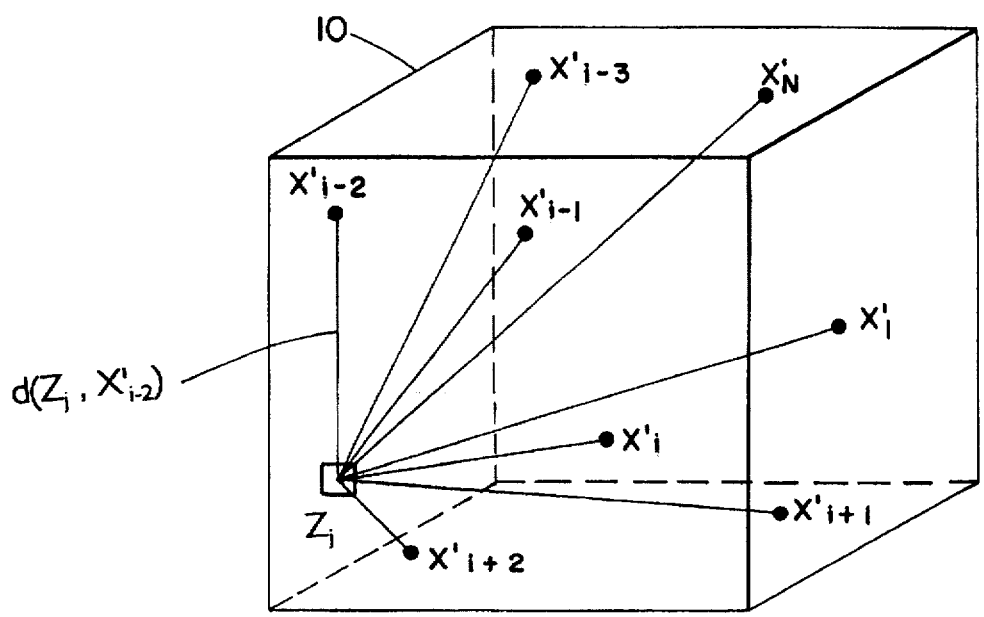
FIG. 4

METHOD FOR REFINING AN EXISTING PRINTER CALIBRATION USING A SMALL NUMBER OF MEASUREMENTS

BACKGROUND OF THE INVENTION

The present invention relates to the color imaging arts. It finds particular application in refining a color correction tables, in color printers and will be described with particular reference thereto.

Heretofore, computers and other electronic equipment have typically generated three-dimensional RGB (red, green, blue) color signals. Many printers, however, receive four-dimensional CMYK (cyan, magenta, yellow, and black) signals as input and print output colors which are measured as corresponding RGB values. A look-up table is commonly provided to convert each digital RGB color signal value to a corresponding digital CMYK value before being received by the printer.

A printer which has an ideal dye behavior has a one-to-one correspondence of cyan-to-red, magenta-to-green, and yellow-to-blue. This means that when printed, the cyan ink will only absorb red light, the magenta ink will only absorb green light, and the yellow ink will only absorb blue light. However, printers inherently have a non-ideal dye behavior and therefore have a complex non-linear colorimetric response. Interactions between the cyan, magenta, and yellow inks exist which result in unwanted absorptions of reds, greens, and blues. Even once a printer is calibrated such that one or a range of input digital CMYK values produce the proper color(s), the full spectrum of CMYK values and printed colors is not accurate. In other words, the colors asked to be printed and the actual colors printed are not the same.

This discrepancy arises because the relationship between digital values that drive the printer and the resulting colorimetric response is a complex non-linear function. Labelling the response, or other values, as "colorimetric" indicates that the response or value has been measured by an instrument. Modeling the colorimetric response to achieve linearity across the available spectrum usually requires many parameters. Typically, a color correction look-up table is built which approximates the mapping between RGB colorimetric space and CMYK values. Each RGB coordinate is typically represented by an 8-bit red value, an 8-bit green value, and an 8-bit blue value. Although the RGB coordinate is capable of addressing a look-up table having $256^3$ locations, measuring and storing $256^3$ values is expensive. The look-up table is typically partitioned into a smaller size such as 16×16×16 (4096) table locations, each of which stores a four-dimensional CMYK value. Other CMYK values are then found by interpolating the known CMYK values using trilinear or tetrahedral interpolation.

The look-up table is built by sending a set of CMYK digital values to the printer, measuring the colorimetric RGB values of the resulting color patches outputted by the printer, and generating the look-up table from the difference between the inputted values and the measured outputted values. More specifically, the color correction look-up table corrects for non-linearities and unwanted absorptions of inks such that the printer prints the true corresponding color. The number of measurements required to characterize the printer adequately, can be as many as 1,000 measurements.

After the color correction table is generated, the printer response tends to drift over time. To correct for the drift, the device is adjusted or recalibrated periodically. Recalibrating the entire correction table involves remeasuring a full set of color patches spanning the available spectrum. This is a time consuming and expensive process. Furthermore, even when the color correction table is initially generated, a user may not be satisfied with the accuracy of calibration in some regions of color space. It would be advantageous to make only a few measurements and refine the quality of the correction table in these regions, rather than repeating the entire calibration process.

Other methods have attempted to reduce the number of measurements required to calibrate the color correction look-up table. In these methods, the outputted CMYK values from the look-up table are individually adjusted by a one-dimensional table storing tone reproduction curve values. The tone reproduction curves map new densities to the old densities in the look-up table so that the original calibration quality is regained. Each tone reproduction curve adjusts only one of the four CMYK inks. Although the number of measurements required to recalibrate one ink are reduced, a resulting printed color involving a mixture of inks becomes unpredictable.

The present invention provides a new and improved method of refining a color correction table which involves a small number of measurements and overcomes the above-referenced problems and others.

SUMMARY OF THE INVENTION

In accordance with the present invention, a new and improved method and apparatus for refining a color correction table of a printer is provided. A set of RGB coordinates are selected from color space. The set of RGB coordinates are less in number than a number of locations in the color correction table. The set of RGB coordinates are mapped through the color correction table into CMYK values and printed by the printer into corresponding color patches. Each color patch is measured to find a colorimetric value. A three-dimensional error value is calculated for each colorimetric value. The error value is the difference between the outputted colorimetric value and its corresponding inputted RGB coordinate. A refinement table is generated from these error values. Generally, the measured RGB locations of the error values will not coincide with node locations of the table. Thus, the error values are interpolated to the other locations in the refinement table using a weighted average of the error values. The contribution of a known error value to a calculated error at a current location is inversely proportional to a Euclidean distance of the current location from the locations of the known error values.

One advantage of the present invention is that a small number of refinement colors are selected. The number of measurements taken are accordingly reduced.

Another advantage of the present invention is that the color correction table is refined in a shorter amount of time and with a reduction in cost.

Another advantage of the present invention is that a user is free to select an arbitrary set of refinement colors within the printer's gamut.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 3A is an illustration of a color correction table of the present invention;

FIG. 3B is an enlargement of a section of the color correction table shown in FIG. 3A;

FIG. 4 is an illustration of a location in the refinement table being interpolated;

DETAILED DESCRIPTION OF THE PREFERRED EMBODIMENTS

With reference to FIGS. 1, 2, 3A and 3B, a color correction table 10 is a three-dimensional table having an R axis, G axis, and B axis representing red, green, and blue colorimetric locations. Each location is identified by a three-dimensional RGB vector which is defined by an 8-bit red value, an 8-bit green value, and an 8-bit blue value. In the preferred embodiment, each axis of the color correction table 10 is partitioned into a smaller number of sections than 256 (i.e., an 8-bit value addresses 256 locations) such as 16 for a total of $16^3$ table locations. Each location stores a CMYK value for converting the RGB address to CMYK color space.

With reference to FIGS. 3A and 3B, the color correction table 10 converts a requested input RGB location $X_{RGB}$ to a corresponding CMYK value $Y_{CMYK}$. For simplicity, FIG. 3B shows a two-dimensional grid of R and G locations with the B value set to zero. For an input RBG color $X_{ij}$ at $(R_i, G_j)$, the corresponding CMYK value $Y_{CMYK}$ is found by interpolating the CMYK valued stored at the nearest neighbor locations of $(R_i, G_j)$ which are $CMYK_1-CMYK_4$ in this example. Preferably, a trilinear or tetrahedral interpolation is performed as is known in the art. As is shown, RGB values such as $X_{ij}$ do not always lie on an intersecting table location.

Figure 1:
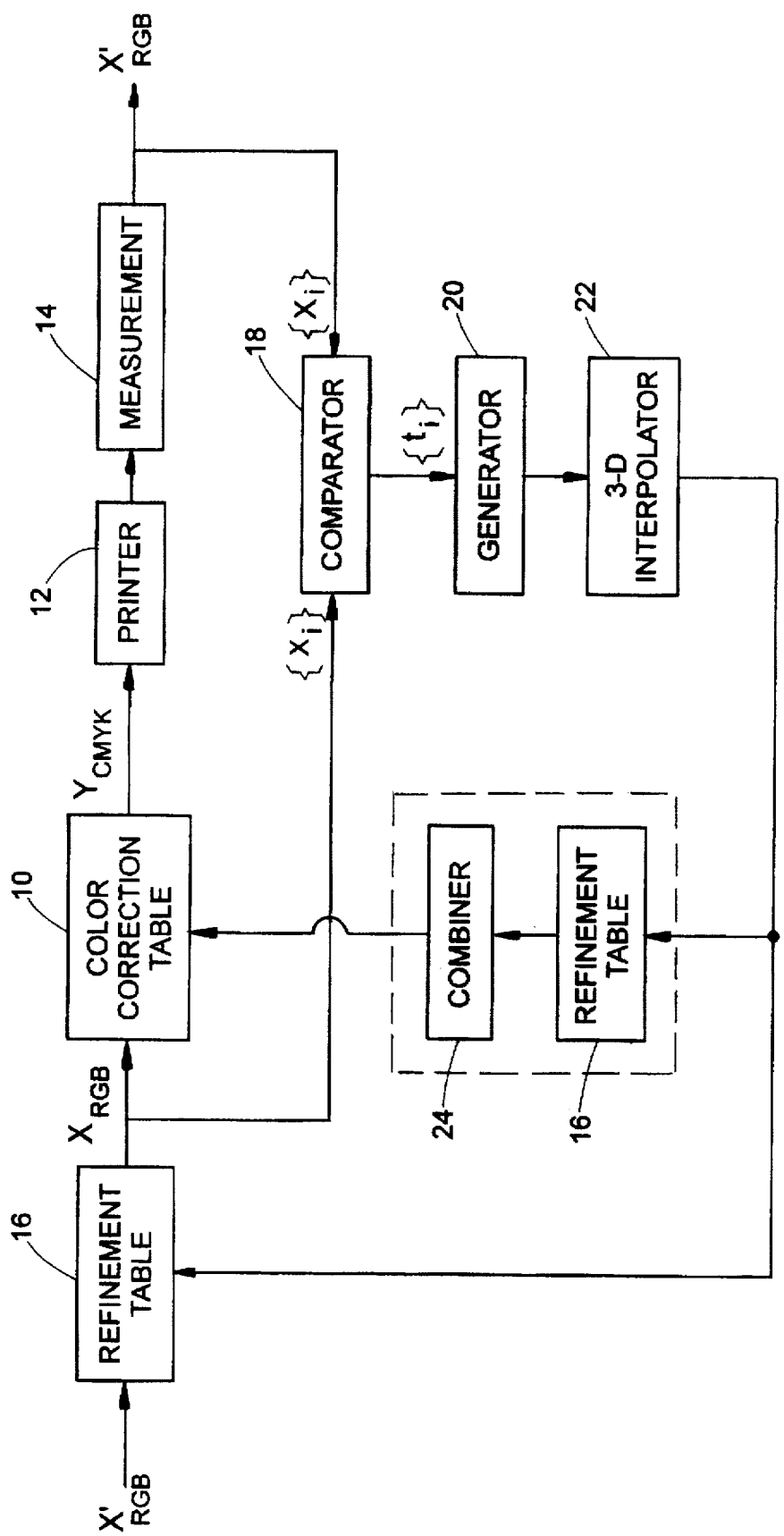
FIG. 1 is a diagrammatic illustration of the color correction system with refinement according to the present invention.

With further reference to FIG. 1, a printer 12 takes as input the CMYK values $Y_{CMYK}$ and prints a corresponding set of color patches. A measuring device 14 measures the color patches and determines corresponding colorimetric RGB coordinates $X_{RGB}'$ for each color patch. The measuring device 14 is preferably a colorimeter, spectrophotometer, or similar device as known to those of ordinary skill in the art. If the conversion of the color correction table 10 and the printer response are perfect inverses of each other, then requested $X_{RGB}$=measured $X_{RGB}'$. However, due to drifting of the printer response, the measured $X_{RGB}'$ frequently does not equal the requested $X_{RGB}$. Errors in the table approximation and imperfections in the printing and measuring processes also create a discrepancy.

To correct for the discrepancy, a refinement table 16 is generated which maps $X_{RGB}'$ to $X_{RGB}$. To adjust the drifting in printer response more accurately across the available spectrum of the printer 12, a set of N RGB colors $\{x_i\}$ $1 \leq i \leq N$, are selected (step 10a), mapped through the color correction table 10 (step 10b), printed, and measured (step 14a) to obtain a corresponding output set of RGB coordinates $\{x_i'\}$. The number N is small in relation to the size of the color correction table. Typically N is on the order of 40 to 200 locations for adequate correction of drift.

Figure 2:
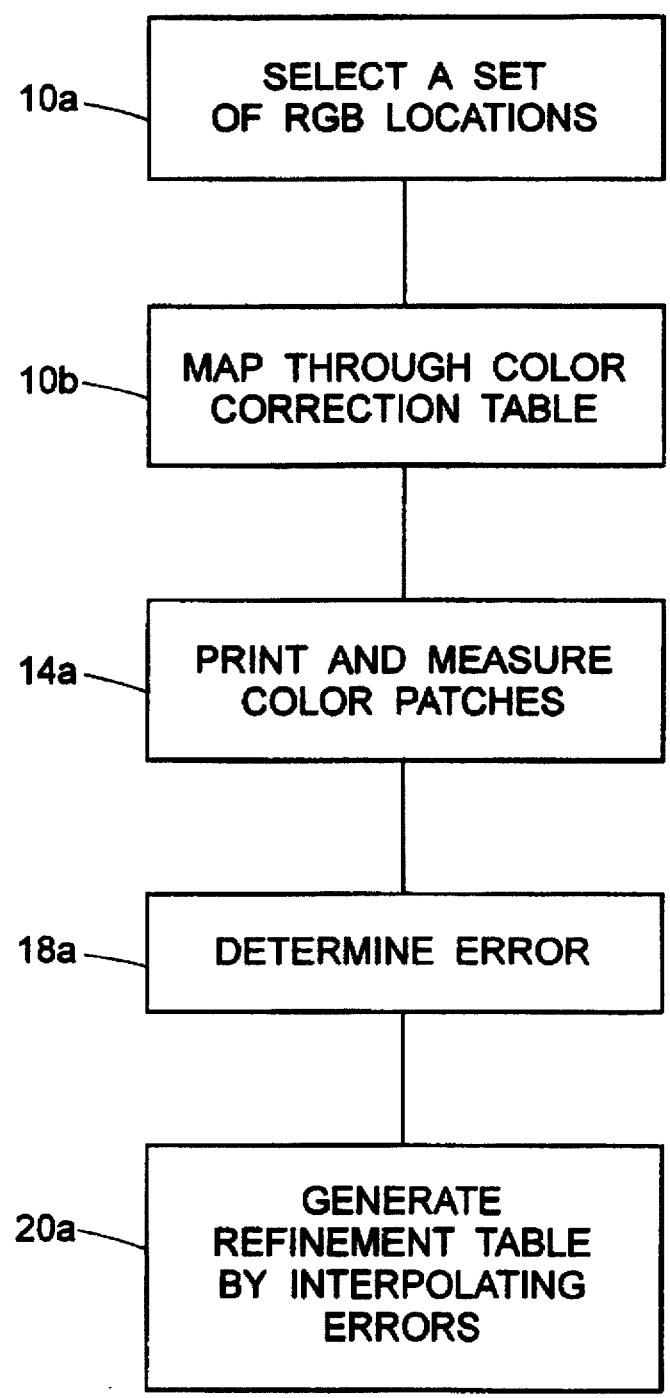
FIG. 2 is a block diagram of the method of the present invention.

With further reference to FIGS. 1 and 2, after printing and measuring the N color patches, a comparator 18 compares each measured RGB value $x_i'$ with the corresponding inputted RGB values $x_i$. A set of N transformation vectors $\{t_i\}$ are calculated from the difference between the values, where $t_i=x_i-x_i'$ for $1 \leq i \leq N$ (step 18a). The refinement table 16 is generated to map the measured RGB coordinates $x_i'$ to the initially inputted RGB coordinates $x_i$. A table generator 20 builds the refinement table from the calculated transformation vectors $t_i$ for the corresponding RGB locations $x_i'$ (step 20a). Thus, if one of the measured RGB values x' is requested to be printed, the refinement table 16 transforms the x' value to the RGB value x. As determined previously, when passed through the color correction table 10, the RGB value x results in the RGB value x' when printed and measured. In this instance, a requested color x' is transformed by the refinement table 16 to the value x which, as discussed above, is the value that causes the color x' to be printed. Therefore, the error between the color requested and the color printed is reduced.

The refinement table 16 is most accurate for the N RGB locations $x_i'$. Because N is only a small fraction of the available printer colors, the refinement table 16 has gaps between the actually measured colors x'. It is also likely, as shown in FIG. 3B, that none of the RGB x' values lie exactly on a table location. In such a case, all the table locations are filled.

The refinement table maps the $x_i'$ to $x_i$. The look-up table 10 has a set of M node locations, denoted $z_j$. A typical value for M is $16^3$=4096. In general, the $z_j$ will not coincide with the measured $x_i'$. Hence, in order to fill the table, an interpolator 22 interpolates the known transformation values $\{t_i\}$ at the measured locations $\{x_i'\}$ $1 \leq i \leq N$, to the table node locations $z_j$, $1 \leq j \leq M$. A scheme which smoothly interpolates among randomly scattered multi-dimensional data is used. In the preferred embodiment, Shepard's algorithm is used.

With reference to FIG. 4, the interpolated transform values are based on a weighted function which is inversely proportional to a distance d $(z_j, x_i')$ between a current node location $z_j$ and the measurement locations $\{x_i'\}$ $1 \leq i \leq N$, normalized by the average distance between $z_j$ and the measured locations. In other words, the closer a measurement location $x_i'$ is to a current node location $z_j$, the transformation value of the measured location x' contributes to the transformation value for the node location $z_j$ to a greater degree. In the preferred embodiment, the weights are proportional to $1/d(z_j, x_i')^4$ $1 \leq i \leq N$, where d denotes the Euclidean distance in three-dimensional space between the locations of $z_j$ and each $x_i'$, i.e.:

$$z_j = \sum_{i}^{N} \frac{t_i}{d(z_j,x_i')^4} / \sum_{i}^{N} \frac{1}{d(z_j,x_i')^4} , \qquad (1)$$

If an unmeasured location $z_j$ is far from all the measured locations $\{x_i'\}$ in color space, $z_j$ will undergo a transformation that is approximately an unweighted average of all the transformation vectors $\{t_i\}$ of the measured locations $\{x_i'\}$. To refine the printer response accurately, it is undesirable for any RGB node location $z_j$ to be far from one of the selected measured locations $x_i'$. To reduce the occurrences of this problem, the initially selected measurement locations $\{x_i\}$ are chosen to span the printer gamut so that no inputted RGB location is distant from all the measured RGB locations $\{x_i'\}$. Alternately, if a user wishes to refine a particular region of the printer gamut, RGB locations from the particular region are chosen as the measurement locations to refine the color correction table. Given that the printer response and table mappings are locally smooth, by eliminating the calibration error at the measurement locations $x_i'$, the error in locations surrounding $x_i'$ are also reduced.

Once the refinement table 16 is completed, it is connected in front of the color correction table 10 to adjust the drift in printer response. Alternatively, a combiner 24 combines the refinement table 16 and the color correction table 10 into one table to reduce additional overhead associated with having two tables.

Figure 5:
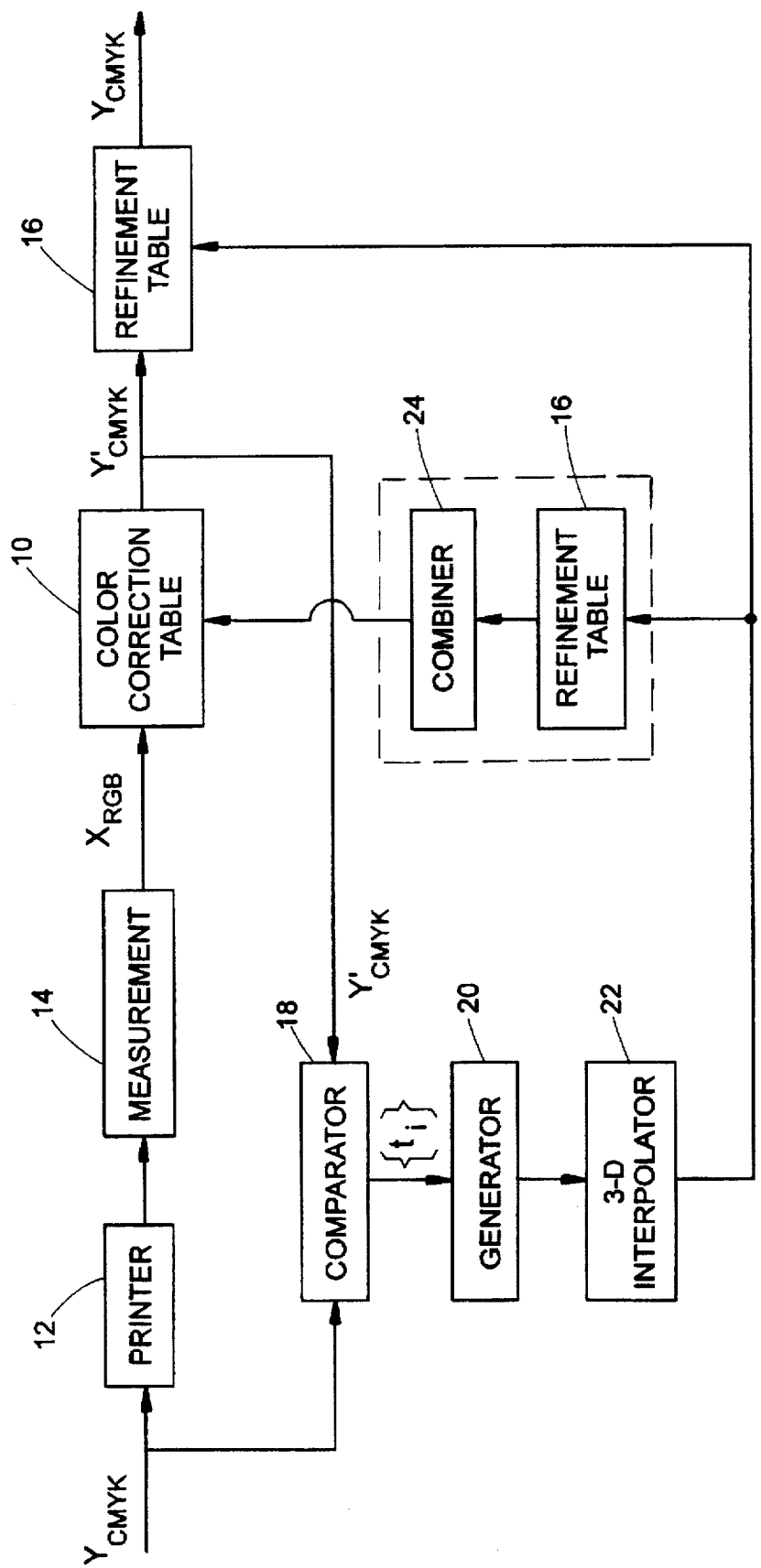
FIG. 5 is an alternative emobidment of the present invention having the refinement table at an output side of the color correction table.

With reference to FIG. 5, an alternative embodiment is shown, where the refinement table is included at the output (CMYK) rather than at the input (RGB) end. A set of N CMYK values $y_i$ are printed 12 and measured 14 to get RGB colors $x_i$. These are mapped through the color correction table 10 to obtain CMYK values $y_i'$. A comparator 18 computes CMYK error vectors $t_i=y_i-y_i'$. These are then smoothly interpolated to the node locations $z_j$ of the refinement table 16 using a method such as Shepard's interpolation 22. The refinement table 16 now follows the color correction table 10. Alternately, a combiner 24 combines the color correction table and refinement table into one table. In this manner, when RGB color $x_i'$ is inputted to the refined color correction system (i.e., 10 combined with 16), the output is $y_i$, which when printed and measured, yields the desired $x_i'$.

Figure 6:
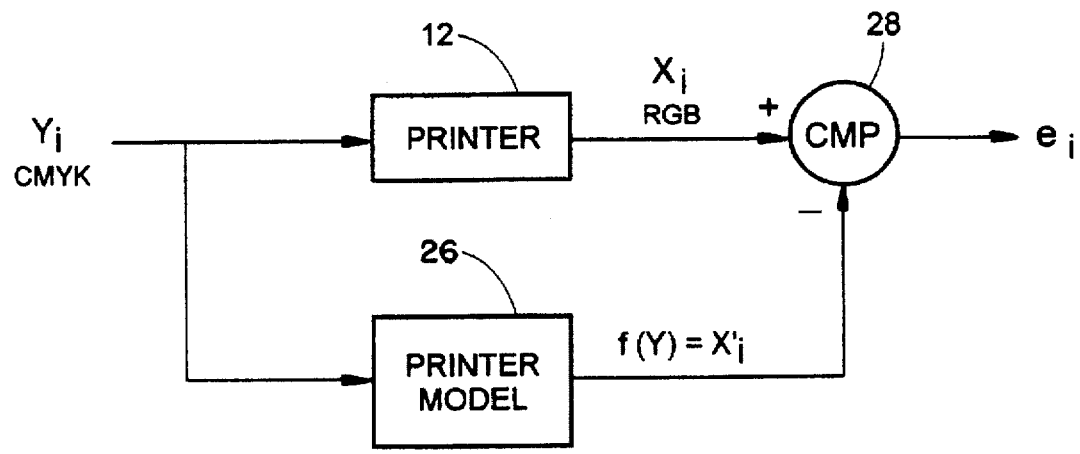
FIG. 6 is an alternative embodiment of the present invention including a printer model.

With reference to the alternative embodiment of FIG. 6, a printer model 26 characterizes the colorimetric response of the printer 12. Given CMYK values, the model 26 predicts the RGB colors which should be obtained if the CMYK values are printed by the printer 12 and measured. The color is generally defined in a colorimetric standard such as CIE XYZ or CIE L*a*b*, or a spectral reflectance function. The printer model 26 characterizes the printer 12 with a relatively small number of measurements. The model enables a user to simulate and rapidly evaluate the printing process without having to make numerous, repetitive measurements. The printer model 26 may also be used for printer calibration, which is essentially a process of inverting the printer model.

To determine the accuracy of the printer response, a set of CMYK correction points $\{y_i\}$ are inputted to the printer 12. The printer 12 prints a resulting RGB colorimetric response $\{x_i\}$. The CMYK correction points $\{y_i\}$ are also passed through the printer model 26. The printer model 26 performs a function f(y) that yields a prediction RGB $x_i'$ value for each inputted $y_i$ value such that f(y)=x'. A comparator 28 compares the printer response values $\{x_i\}$ with the printer model values $\{x_i'\}$ and obtains a prediction error $e_i$ at each of the correction points $y_i$. In the preferred embodiment, the comparator subtracts the printer response and model values.

Figure 7:
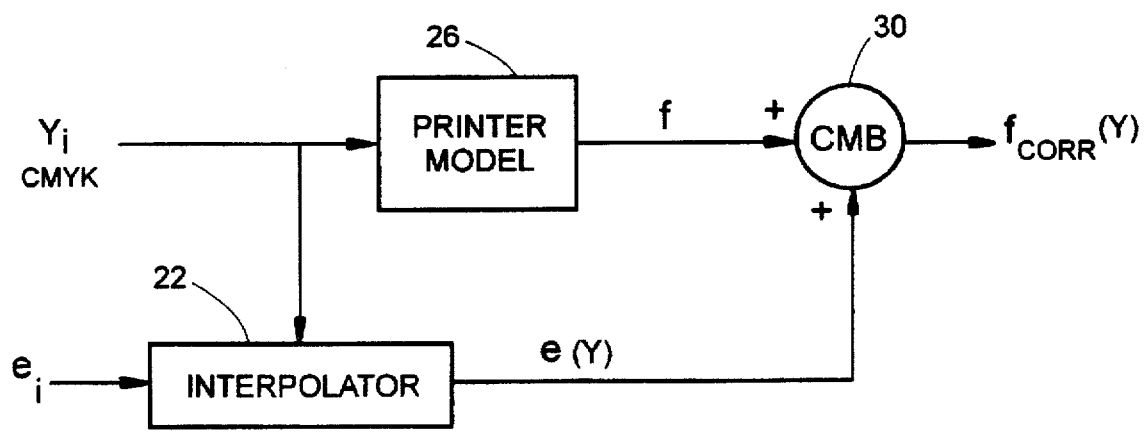
FIG. 7 is a block diagram of the refinement of the embodiment shown in FIG. 5.

With reference to FIG. 7, the interpolator 22 interpolates the prediction errors $e_i$ using Shepard's rule to obtain a prediction error e(y) for all other CMYK values y within the available printer spectrum:

$$e(y) = \begin{cases} \sum_{i=1}^{N} \frac{1}{\|y-y_i\|^4} e_i / \sum_{i=1}^{N} \frac{1}{\|y-y_i\|^4} & \text{if } \|y-y_i\| > d_t \\ e_i & \text{if } \|y-y_i\| \leq d_t \end{cases} \quad (2)$$

where $\|\ \|$ is a Euclidean distance in four-dimensional CMYK space. A predetermined distance threshold $d_t$ indicates that if an input CMYK value y is very close to one of the correction points $\{y_i\}$, then the prediction error is set to $e_i$. A combining function 30 adjusts the printer response with the prediction errors e(y). The corrected response of the printer 12 is then given by:

$$f_{corr}(y) = f(y) + e(y) \quad (3)$$

The correction points $\{y_i\}$ affect the reduction in the model error. The correction points are chosen based on a desired set of factors such as the type of printer model f( ) used and the behavior of the printer 12. Choosing the correction points in CMYK space from an area where the model error is large results in an overall reduction in model error.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of refining a color imaging system of a printer including a pre-generated color correction table having a plurality of locations comprising:

selecting a set of RGB locations from a color space, the set of RGB locations being less in number than the plurality of locations of the pre-generated color correction table;

mapping the set of RGB locations through the pre-generated color correction table and obtaining a set of CMYK values;

printing a set of color patches, each color patch corresponding to one value from the set of CMYK values obtained from the pre-generated color correction table and measuring a colorimetric RGB location for each of the printed color patches;

determining an actual error value for each of the color patches printed, the actual error value being a difference between the colorimetric RGB location of a color patch and a corresponding RGB location from the selected set of RGB locations mapped through the pre-generated color correction table;

generating a refinement table by generating a correction value for each location of the refinement table from the determined actual error values, including interpolating the determined actual error values to form the correction values for the refinement table such that each location of the refinement table refines a corresponding location in the pre-generated color correction table, the interpolating including using a weighted average of the actual error values, each actual error value being weighted in accordance with Euclidean distances between the location for each correction value and the RGB locations of the actual error values.

2. The method of refining a color imaging system of a printer as set forth in claim 1 wherein the selecting step selects 40 to 200 RGB locations.

3. The method of refining a color imaging system of a printer as set forth in claim 2 wherein the set of RGB locations selected span a color gamut of the printer.

4. The method of refining a color imaging system of a printer as set forth in claim 1 further including after the interpolating step, combining the refinement table and the color correction table.

5. A method of refining a pre-existing color correction table of a printer comprising:

measuring a colorimetric value printed by the printer corresponding to a printer input value outputted from the pre-existing color correction table based on a selected value inputted to the pre-existing color correction table;

calculating an error vector for the colorimetric value, the error vector being a difference between the colorimetric value and the selected value inputted to the pre-existing color correction table;

generating a refinement table having a plurality of locations, each of the plurality of locations storing an adjustment value calculated based on the error vectors and an inversely proportional relationship of Euclidean distances from each location to the locations storing the error vectors; and combining the refinement table with the pre-existing color correction table to refine the pre-existing color correction table.

6. The method of refining a pre-existing color correction table as set forth in claim 5 wherein the measuring step includes measuring colorimetric values corresponding to less than 5% of values of the color correction table.

7. The method of refining a pre-existing color correction table as set forth in claim 5 wherein the measuring includes measuring 40–200 colorimetric values printed by the printer, each of the 40–200 colorimetric values corresponding to one selected value of an equal number of 40–200 selected values inputted to the color correction table.

8. The method of refining a pre-existing color correction table as set forth in claim 7 wherein the 40–200 selected values are selected to span a color gamut of the printer.

9. A method of refining a pre-existing color correction table which transforms an input color space to an output color space for a printer, the pre-existing color correction table being previously generated from a set of generation data from the input color space, the method comprising:

mapping an input data point selected from the input color space through the pre-existing color correction table, the input data point being selected independently from the set of generation data used for generating the pre-existing color correction table;

printing the mapped input data point as a color patch;

measuring the printed color patch to obtain a corresponding output data point from the output color space;

comparing the input data point from the input color space with the measured output data point to obtain an error vector;

generating a refinement table having a number of locations equal to a number of locations in the color correction table, the error vectors being stored in corresponding locations in the refinement table addressed by the output data point; and, interpolating the error vector across other locations of the refinement table.

10. The method of refining a pre-existing color correction table as set forth in claim 9 wherein the interpolating step includes for each other location determining an interpolated error value in accordance with a sum of the error vectors each weighted by a distance between the each location and the location of each error vector.

11. The method of refining a pre-existing color correction table as set forth in claim 9 further including:

simulating a colorimetric value from the output color space corresponding to the input data point from the input color space; and, comparing the simulated colorimetric value with the measured output data point to determine the error vector.

12. A method of generating a refinement table using a plurality of correction colors for refining a color imaging system having a pre-generated color transformation table, the method comprising:

printing the plurality of correction colors with a printer as a plurality of output colors;

simulating the plurality of correction colors with a printer model as a plurality of model output colors;

determining an error value between each of the plurality of output colors and a corresponding model output color;

interpolating the error values to generate correction values for a refinement table, each of the correction values being stored at a location in the refinement table for correcting a location in the pre-generated color transformation table.

13. A color refining system including a pre-generated color correction table which transforms an input color space to an output color space for a printer, the system comprising:

a printer which converts input data points from the input color space into color patches, the input data points being received from the pre-generated color correction table;

a colorimetric measuring device which measures each of the color patches to obtain a corresponding output data point of the output color space;

a comparator for comparing the input data point with the output data point to obtain an error vector;

a refinement table having a plurality of locations, the error vectors being stored at locations in the refinement table corresponding to the output color space; and, an interpolator for interpolating the error vectors to generate interpolated error vectors for loading into locations of the refinement table.

14. The color refining system as set forth in claim 13 further including a means for combining the refinement table with the color correction table.

\* \* \* \* \*